(12) United States Patent
Matsumoto

(10) Patent No.: US 7,988,300 B2
(45) Date of Patent: Aug. 2, 2011

(54) ILLUMINATION DEVICE, PROJECTION VIDEO DISPLAY DEVICE, AND FLY-EYE LENS

(75) Inventor: Shinya Matsumoto, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 453 days.

(21) Appl. No.: 12/172,331

(22) Filed: Jul. 14, 2008

(65) Prior Publication Data
US 2009/0021700 A1    Jan. 22, 2009

(30) Foreign Application Priority Data
Jul. 19, 2007    (JP) .................................. 2007-187954

(51) Int. Cl.
G02B 27/48    (2006.01)
G02B 27/12    (2006.01)
(52) U.S. Cl. ......................... 353/38; 359/619; 359/599
(58) Field of Classification Search ............... 353/38, 353/37; 359/619, 599
See application file for complete search history.

(56) References Cited

U.S. PATENT DOCUMENTS
4,132,468 A * 1/1979 Lo et al. ........................... 353/7

FOREIGN PATENT DOCUMENTS
JP    09-090510 A    4/1997

* cited by examiner

Primary Examiner — Tony Ko
(74) Attorney, Agent, or Firm — Marvin A. Motsenbocker; Mots Law, PLLC

(57) ABSTRACT

An illumination device includes a light source for emitting a light flux having a solid angle; an optical element for converging the light from the light source in at least one direction to convert the light into parallel light; and a fly-eye lens for allowing incidence of the parallel light from the optical element to guide uniform light to an area for illumination. Assuming that a certain number of lens cells in the fly-eye lens in a column direction or a row direction are defined as a lens cell unit, one of the lens cell units is relatively displaced with respect to the other one of the lens cell units in the column direction or the row direction, and the number of steps for displacement among the lens cell units in the fly-eye lens is set to 2 or more.

5 Claims, 12 Drawing Sheets

STEP NUMBER = 2

STEP NUMBER = 2

STEP NUMBER = 2

STEP NUMBER = 3

STEP NUMBER = 1

STEP NUMBER = 0

STEP NUMBER = 0

STEP NUMBER = 4

STEP NUMBER = 4

ILLUMINATION DEVICE, PROJECTION VIDEO DISPLAY DEVICE, AND FLY-EYE LENS

This application claims priority under 35 U.S.C. Section 119 of Japanese Patent Application No. 2007-187954 filed Jul. 19, 2007, entitled "ILLUMINATION DEVICE, PROJECTION VIDEO DISPLAY DEVICE, AND FLY-EYE LENS".

BACKGROUND OF THE INVENTION

1. Field of the Invention

The present invention relates to an illumination device, a projection video display device loaded with the illumination device, and a fly-eye lens to be incorporated in the illumination device, and is more particularly directed to an arrangement, in which a laser light source is used as an emission light source.

2. Disclosure of Related Art

Conventionally, in a projection video display device (hereinafter, called as a "projector"), there has been used a lamp light source such as an ultra-high pressure mercury lamp, a metal halide lamp, or a xenon lamp, as an emission light source. Also, in recent years, a projector incorporated with a solid-state light source such as a semiconductor laser, as an emission light source, has been developed. The laser light source has been noticed as an emission light source for a next-generation projector, in view of a point that the laser light source has a superior performance of rendering a wide color space with high luminance and high precision.

In the case where a laser light source operable to emit a light flux having a large solid angle is used as an emission light source, it is necessary to properly convert laser light to be emitted from the laser light source into parallel light. In performing the conversion operation, it is possible to use a lens, a diffraction grating, or a like device, as means for converting laser light into parallel light. In converting laser light into parallel light by using a lens, a diffraction grating, or a like device, an intensity distribution of laser light to be obtained after transmission through the lens, the diffraction grating, or the like device may become non-uniform.

For instance, as shown in FIG. 12A, in the case where a light flux to be emitted from a laser light source is converged in Y-axis direction by a cylindrical lens, an intensity distribution of laser light to be obtained after transmission through the cylindrical lens is as shown in FIG. 12B. FIG. 12B is a diagram schematically showing an intensity distribution of laser light to be obtained after conversion into parallel light by using the optical system shown in FIG. 12A in monochromatic expression, using an optical simulation software. As shown in FIG. 12B, the light intensity is increased, as the color is closer to white. In this arrangement, the light intensity distribution is non-uniform in Y-axis direction.

In some cases in an optical system for a projector, a fly-eye lens is provided as means for guiding uniform light to an imager (such as a liquid crystal panel). In such a case, the fly-eye lens is provided at a position posterior to an optical component such as the cylindrical lens or the diffraction grating. However, as described above, the intensity distribution of laser light to be obtained after transmission through a cylindrical lens or a like device may become non-uniform. Accordingly, in the case where laser light, after conversion into parallel light by a lens or a like device, is guided to an imager by a fly-eye lens, illuminance non-uniformity may be generated in the imager, which may generate non-uniformity in a projected image.

SUMMARY OF THE INVENTION

A primary object of the present invention is to satisfactorily and effectively suppress illuminance non-uniformity in an imager.

A first aspect of the present invention is directed to an illumination device. The illumination device according to the first aspect includes: a light source; an optical element for converting light from the light source into parallel light in at least one direction; and a fly-eye lens for allowing incidence of the parallel light from the optical element to guide uniform light to an area for illumination. The light source is operable to emit a light flux having a solid angle. The optical element is operable to converge at least light diverging in one direction, out of the light from the light source. A certain number of lens cells in the fly-eye lens in a column direction or a row direction are defined as a lens cell unit. In this arrangement, one of the lens cell units is relatively displaced with respect to the other one of the lens cell units in the column direction or the row direction. The number of steps for displacement among the lens cell units in the fly-eye lens is set to 2 or more.

In the above illumination device, preferably, assuming that the number of steps for displacement is "s", and the size of one lens cell in the displacing direction of the lens cell unit is "P", a displacement distance "d" of the lens cell unit per step may be defined in accordance with e.g. the following equation:

$$d = P/(s+1)$$

In the illumination device according to the first aspect, preferably, the light source may include a laser light source. In this arrangement, the optical element may be operable to converge laser light from the laser light source at least in a direction of major axis of beam spot for conversion into the parallel light. Also, the lens cell units in the fly-eye lens may be displaced from each other in the major axis direction.

Further preferably, the optical element may include at least one cylindrical lens. In the case where laser light is converted into parallel light in the major axis direction of beam spot by the cylindrical lens, the cylindrical lens may be operable to convert the laser light into parallel light in the minor axis direction of beam spot. Further preferably, two cylindrical lenses disposed at such positions as to make the convergence directions thereof orthogonal to each other, and a collimator lens may be used in combination to convert laser light into parallel light both in the major axis direction and the minor axis direction, while shaping the beam.

In the case where a sufficient distance is not secured between the laser light source and the fly-eye lens, it is possible to use a cylindrical lens of a Fresnel lens shape, which is advantageous in reducing the lens thickness. Further, beam shaping means constituted of a diffraction element may be provided.

A second aspect of the present invention is directed to a projection video display device. The projection video display device according to the second aspect includes the illumination device having the above arrangement, and an imager to be disposed in the area for illumination.

A third aspect of the present invention is directed to a fly-eye lens. In the fly-eye lens according to the third aspect, a certain number of lens cells in the fly-eye lens in a column direction or a row direction are defined as a lens cell unit. In this arrangement, one of the lens cell units is relatively displaced with respect to the other one of the lens cell units in the column direction or the row direction. The number of steps for displacement among the lens cell units in the fly-eye lens is set to 2 or more.

BRIEF DESCRIPTION OF THE DRAWINGS

These and other objects, and novel features of the present invention will become more apparent upon reading the following detailed description along with the accompanying drawings.

The drawings are provided mainly for describing the present invention, and do not limit the scope of the present invention.

DESCRIPTION OF PREFERRED EMBODIMENTS

Figure 1:
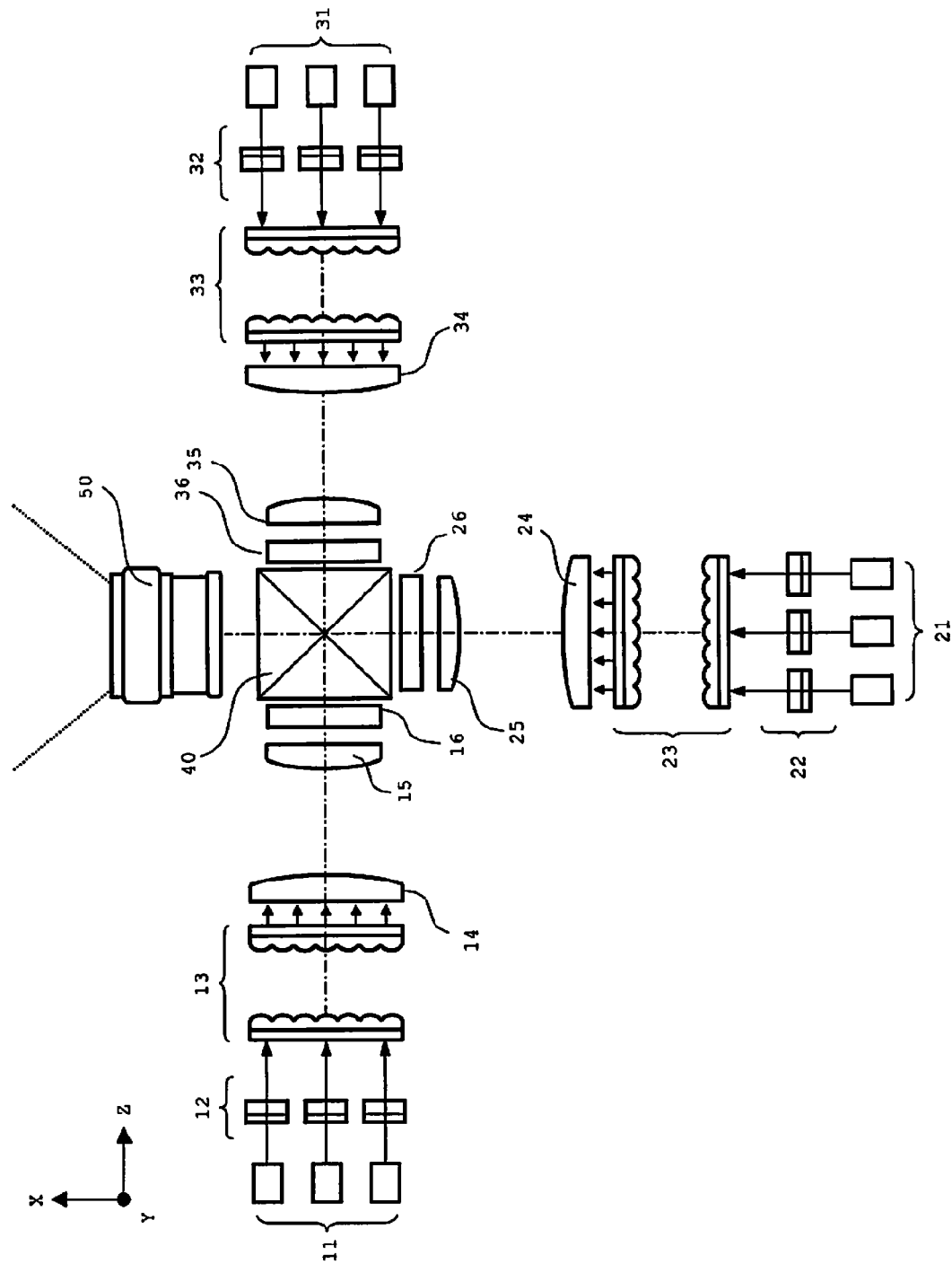
FIG. 1 is a diagram showing an optical system for a projector embodying the present invention.

FIG. 1 is a diagram showing an optical system for a projector embodying the invention.

Referring to FIG. 1, the reference numeral 11 indicates a laser array disposed on X-Y plane. The laser array 11 is constituted of multiple laser light sources. The laser light sources for emitting laser light (hereinafter, called as "R light") having a red wavelength band are arranged in matrix on X-Y plane. Polarization directions of R light to be emitted from the laser light sources are aligned in one direction. Also, in the laser light sources, the major axis of beam spot is aligned in parallel to Y-axis direction.

R light to be emitted from the laser array 11 is converged in Y-axis direction by a corresponding cylindrical lens 12 for conversion into parallel light, and then is incident onto a fly-eye lens unit 13.

The fly-eye lens unit 13 includes a first fly-eye lens and a second fly-eye lens each constituted of a group of fly-eye lens cells. The fly-eye lens unit 13 is adapted to impart a lens function to the light to be incident from the cylindrical lenses 12 so that a light amount distribution of light to be incident onto a liquid crystal panel 16 is made uniform. Specifically, light which has been transmitted through one of the lens cells in the first fly-eye lens is transmitted through a counterpart lens cell in the second fly-eye lens. Thereby, the light is incident onto the liquid crystal panel 16 with a predetermined aspect ratio (e.g. 16:9). The arrangements, operations, and effects of the first fly eye lens and the second fly eye lens will be described later in detail.

A condenser lens 14 imparts a condensing function to the light incident from the fly-eye lens unit 13. A lens 15 is adapted to convert R light into parallel light for incidence onto the liquid crystal panel 16. The liquid crystal panel 16 is driven in accordance with a drive signal for red color to modulate R light depending on a driving condition of the liquid crystal panel 16. R light transmitted through the lens 15 is incident onto the liquid crystal panel 16 via an incident-side polarizer (not shown).

The reference numeral 21 indicates a laser array disposed on Y-Z plane. The laser array 21 is constituted of multiple laser light sources. The laser light sources for emitting laser light (hereinafter, called as "G light") having a green wavelength band are arranged in matrix on Y-Z plane. Polarization directions of G light to be emitted from the laser light sources are aligned in one direction. The laser light sources are arranged at such positions that the major axis of beam spot is aligned in parallel to Y-axis direction.

G light to be emitted from the laser array 21 is converged in Y-axis direction by a corresponding cylindrical lens 22 for conversion into parallel light, and then is incident onto a fly-eye lens unit 23.

Similarly to the fly-eye lens unit 13, the fly-eye lens unit 23 includes a first fly-eye lens and a second fly-eye lens. The function of the fly-eye lens unit 23 is substantially the same as the function of the fly-eye lens unit 13. The arrangements, operations, and effects of the first fly eye lens and the second fly eye lens in the fly-eye lens unit 23 will be described later in detail.

A condenser lens 24 imparts a condensing function to the light incident from the fly-eye lens unit 23. A lens 25 is adapted to convert G light into parallel light for incidence onto a liquid crystal panel 26. The liquid crystal panel 26 is driven in accordance with a drive signal for green color to modulate G light depending on a driving condition of the liquid crystal panel 26. G light transmitted through the lens 25 is incident onto the liquid crystal panel 26 via an incident-side polarizer (not shown).

The reference numeral 31 indicates a laser array disposed on X-Y plane. The laser array 31 is constituted of multiple laser light sources. The laser light sources for emitting laser light (hereinafter, called as "B light") having a blue wavelength band are arranged in matrix on X-Y plane. Polarization directions of B light to be emitted from the laser light sources are aligned in one direction. The laser light sources are arranged at such positions that the major axis of beam spot is aligned in parallel to Y-axis direction.

B light to be emitted from the laser array 31 is converged in Y-axis direction by a corresponding cylindrical lens 32 for conversion into parallel light, and then is incident onto a fly-eye lens unit 33.

Similarly to the fly-eye lens units 13 and 23, the fly-eye lens unit 33 includes a first fly-eye lens and a second fly-eye lens. The function of the fly-eye lens unit 33 is substantially the same as the functions of the fly-eye lens units 13 and 23. The arrangements, operations, and effects of the first fly eye lens and the second fly eye lens in the fly-eye lens unit 33 will be described later in detail.

A condenser lens 34 imparts a condensing function to the light incident from the fly-eye lens unit 33. A lens 35 is adapted to convert B light into parallel light for incidence onto a liquid crystal panel 36. The liquid crystal panel 36 is driven in accordance with a drive signal for blue color to modulate B light depending on a driving condition of the liquid crystal panel 36. B light transmitted through the lens 35 is incident onto the liquid crystal panel 36 via an incident-side polarizer (not shown).

A dichroic prism 40 is adapted to combine R light, G light, and B light that have been modulated by the liquid crystal panels 16, 26, and 36 and outputted through respective corresponding output-side polarizers (not shown) for incidence onto a projection lens 50. The projection lens 50 includes a lens group for focusing projection light on a projection plane, and an actuator for controlling a zoom condition and a focusing condition of a projected image by displacing a part of the lens group in an optical axis direction.

Figure 2B:
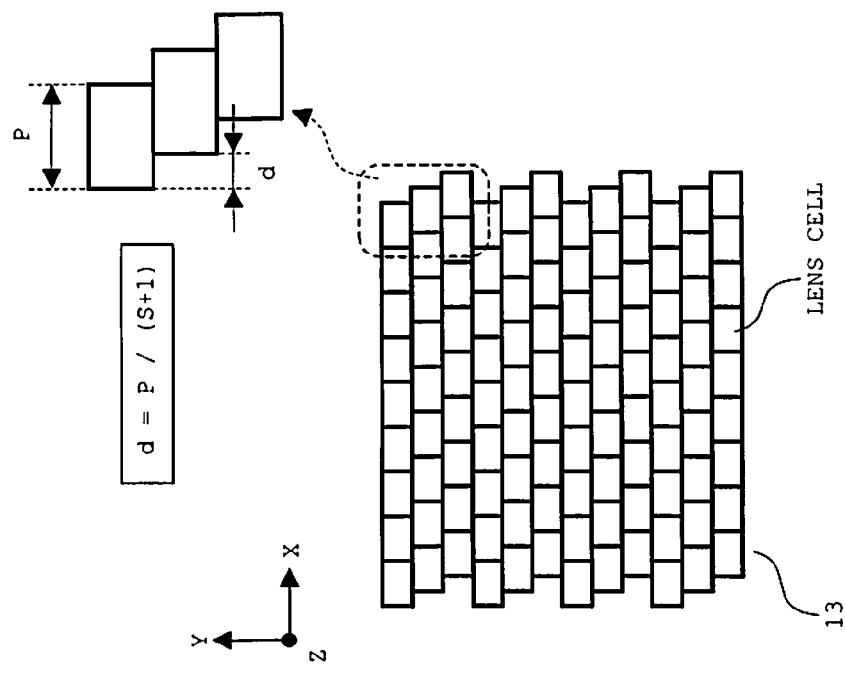
FIGS. 2A and 2B are diagrams showing arrangement examples of a fly-eye lens in the embodiment.
Figure 2A:
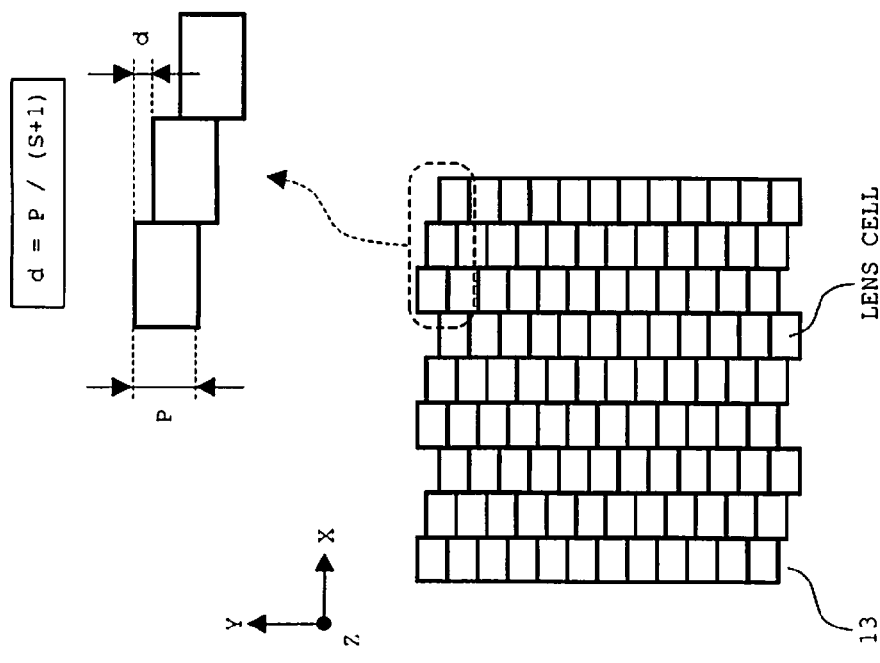

FIG. 2A is a diagram showing an arrangement of the first fly-eye lens (the second fly-eye lens) constituting the fly-eye lens unit 13. The first fly-eye lens (the second fly-eye lens) constituting the fly-eye lens unit 23, 33 has substantially the same arrangement as shown in FIG. 2A.

As shown in FIG. 2A, the first fly-eye lens (the second fly-eye lens) is constructed in such a manner that steps are formed in Y-axis direction. Specifically, a lens cell group (corresponding to a lens cell unit in the claims) constituted of a certain number of lens cells arrayed in Y-axis direction, is displaced in position with respect to an adjoining lens cell group (corresponding to a lens cell unit in the claims) by a distance "d" in Y-axis direction. In the embodiment, assuming that the number of steps (hereinafter, called as "the step number") by which a lens cell group is displaced is "s", and the size of one lens cell in Y-axis direction is "P", the distance "d" is defined in accordance with the following equation (1).

$$d = P/(s+1) \quad (1)$$

In the arrangement example shown in FIG. 2A, the first-column lens cell group, the fourth-column lens cell group, and the seventh-column lens cell group from the left side are aligned at the same position in Y-axis direction. The second-column lens cell group, the fifth-column lens cell group, and the eighth-column lens cell group from the left side are displaced by one step in Y-axis direction with respect to the first-column lens cell group, the fourth-column lens cell group, and the seventh-column lens cell group from the left side. Further, the third-column lens cell group, the sixth-column lens cell group, and the ninth-column lens cell group from the left side are displaced by one step in Y-axis direction with respect to the second-column lens cell group, the fifth-column lens cell group, and the eighth-column lens cell group from the left side. In this arrangement, the step number "s" is; s=2. Accordingly, the displacement distance "d" between the adjoining lens cell groups is: d=P/3.

Figure 3B:
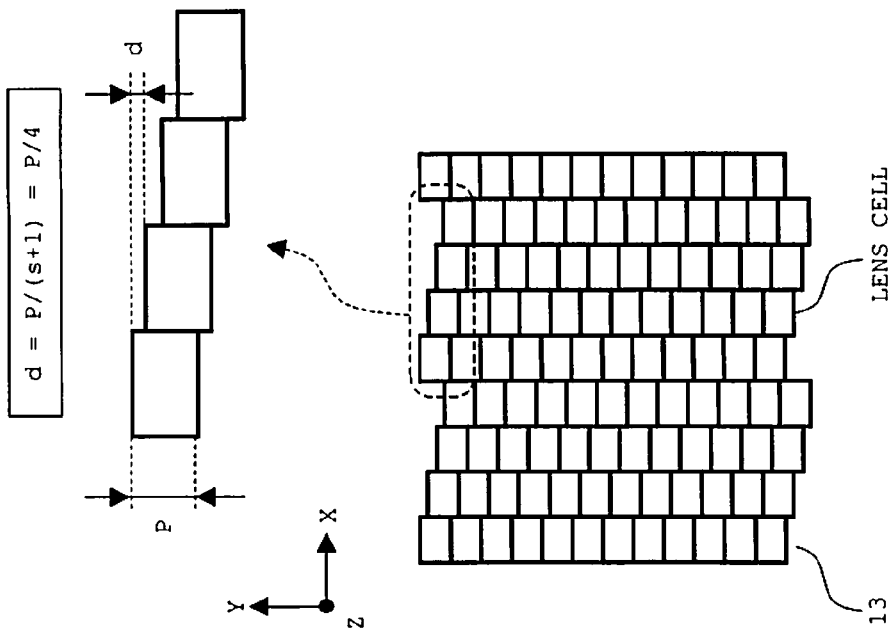
FIGS. 3A and 3B are diagrams showing other arrangement examples of the fly-eye lens in the embodiment.
Figure 3A:
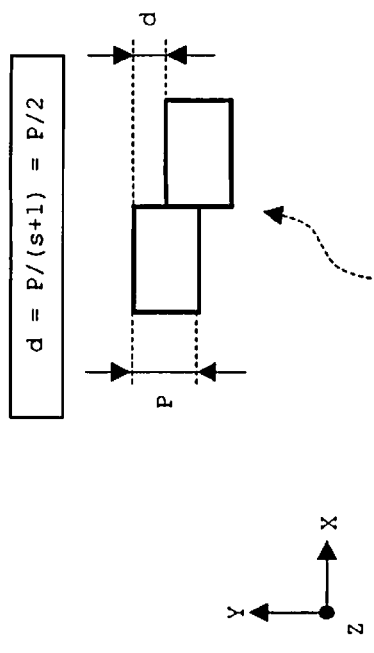

FIG. 3A is a diagram showing another arrangement example of the first fly-eye lens (the second fly-eye lens) constituting the fly-eye lens unit 13. In the arrangement example shown in FIG. 3A, the first-column lens cell group, the third-column lens cell group, the fifth-column lens cell group, the seventh-column lens cell group, and the ninth-column lens cell group from the left side are aligned at the same position in Y-axis direction. The second-column lens cell group, the fourth-column lens cell group, the sixth-column lens cell group, and the eighth-column lens cell group from the left side are displaced by one step in Y-axis direction with respect to the first-column lens cell group, the third-column lens cell group, the fifth-column lens cell group, the seventh-column lens cell group, and the ninth-column lens cell group from the left side. In this arrangement, the step number "s" is: s=1. Accordingly, the displacement distance "d" between the adjoining lens cell groups is: d=P/2.

FIG. 3B is a diagram showing another arrangement example of the first fly-eye lens (the second fly-eye lens) constituting the fly-eye lens unit 13. In the arrangement example shown in FIG. 3B, the first-column lens cell group, the fifth-column lens cell group, and the ninth-column lens cell group from the left side are aligned at the same position in Y-axis direction. The second-column lens cell group and the sixth-column lens cell group from the left side are displaced by one step in Y-axis direction with respect to the first-column lens cell group, the fifth-column lens cell group, and the ninth-column lens cell group from the left side. Also, the third-column lens cell group and the seventh-column lens cell group from the left side are displaced by one step in Y-axis direction with respect to the second-column lens cell group and the sixth-column lens cell group from the left side. Further, the fourth-column lens cell group and the eighth-column lens cell group are displaced by one step in Y-axis direction from the left side with respect to the third-column lens cell group and the seventh-column lens cell group from the left side. In this arrangement, the step number "s" is: s=3. Accordingly, the displacement distance "d" between the adjoining lens cell groups is: d=P/4.

As described above, in the case where the step number "s" is: s=k (where k is an integer of 1 or more), the positions of the respective lens cell groups are defined every other (k+1) columns of lens cell groups arrayed in X-axis direction. In other words, assuming that the position of the lens cell group at the leftmost column is defined as a reference position, the lens cell groups of (k) columns among the lens cell groups of (k+1) columns are each displaced in position in Y-axis direction by a predetermined distance with respect to the reference position. In this arrangement, the displacement distance "d" between the lens cell groups of adjoining columns is defined based on the equation (1).

In this embodiment, the step number "s" is defined to satisfy s≧2. This is because illuminance non-uniformity with respect to the liquid crystal panel 16 is satisfactorily suppressed, in the case where the step number "s" is set to 2 or more, as will be shown in the following simulation examples.

Figure 4:
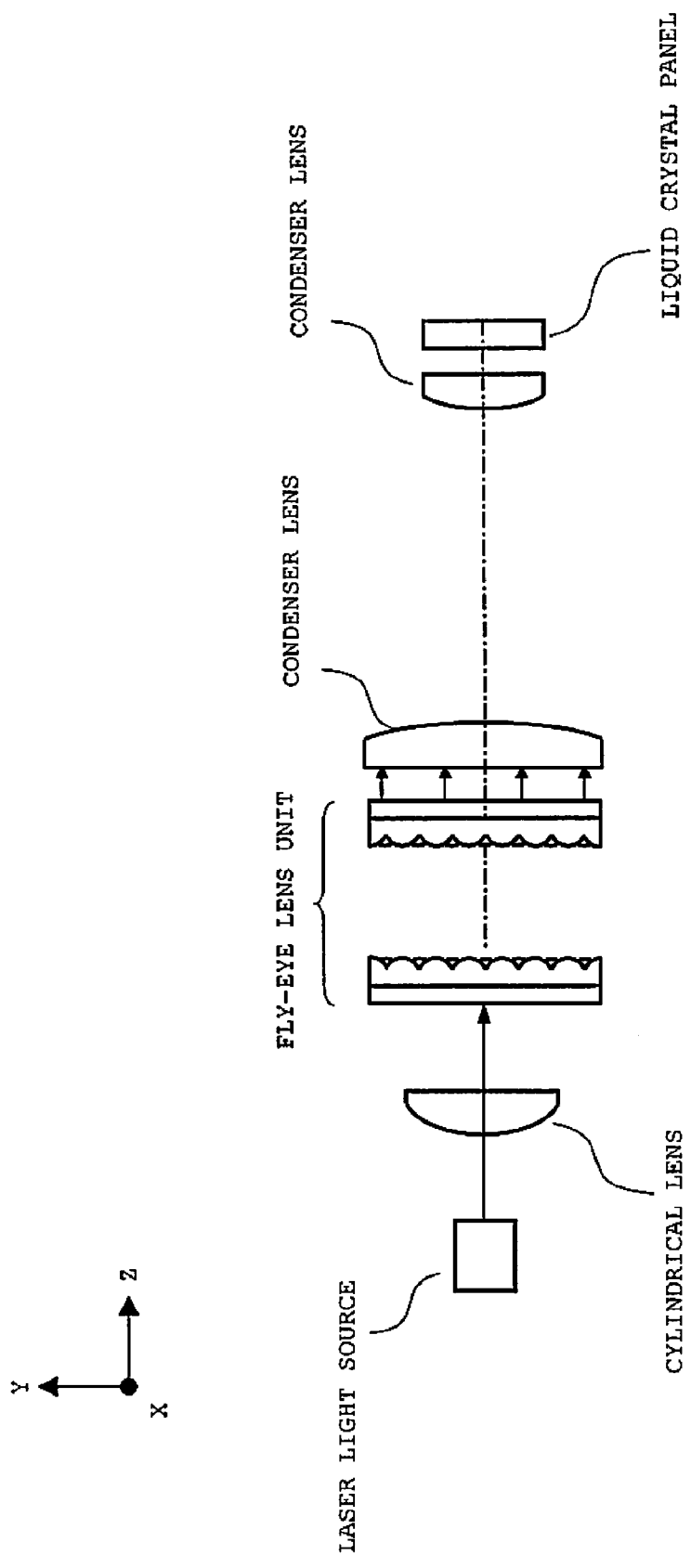
FIG. 4 is a diagram showing an optical system as a simulation example in the embodiment.

FIG. 4 is a diagram showing an optical system for use in a simulation example. In the simulation example, as shown in FIG. 4, one laser light source and one cylindrical lens are used. Similarly to the arrangement shown in FIG. 1, the laser light source is arranged at such a position that the major axis of beam spot is aligned in parallel to Y-axis direction. The cylindrical lens is adapted to converge laser light to be emitted from the laser light source in Y-axis direction for conversion into parallel light. The arrangement of optical components posterior to a fly-eye lens unit is substantially the same as the corresponding arrangement shown in FIG. 1.

Figure 5A:
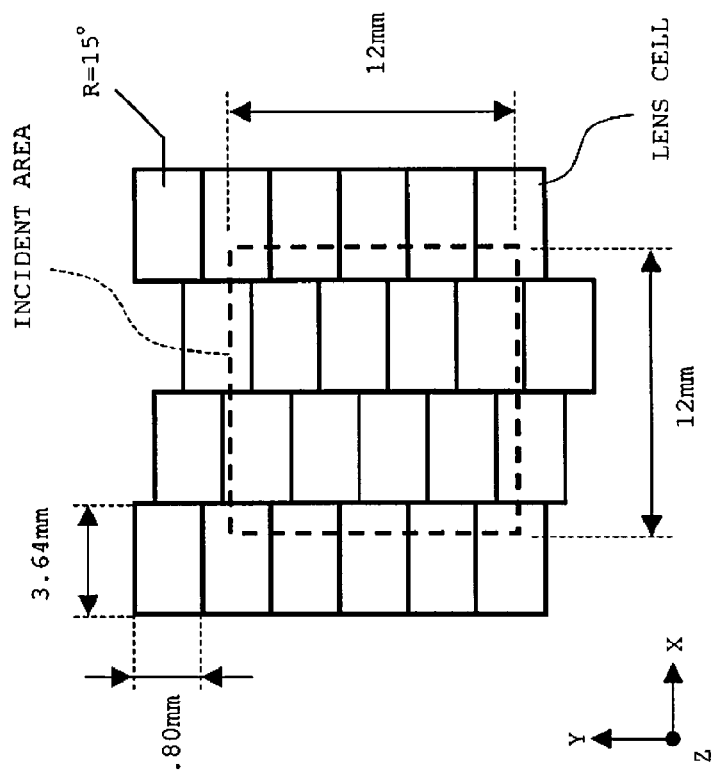
FIGS. 5A and 5B are diagrams each showing an arrangement of a fly-eye lens as a simulation example in the embodiment.
Figure 5B:
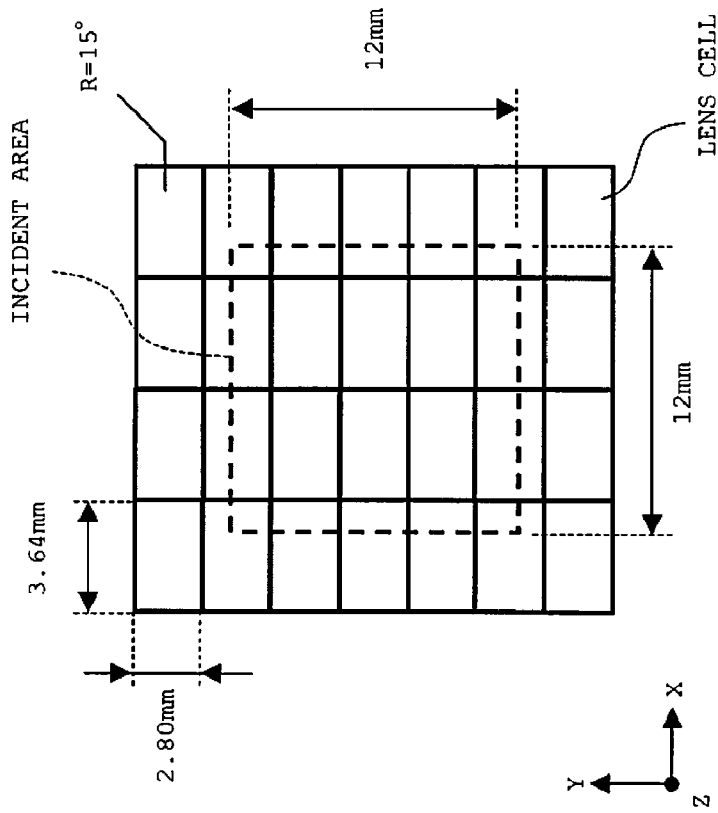

FIGS. 5A and 5B are diagrams each showing an arrangement of a fly-eye lens and an incident state of laser light in the simulation example. As shown in FIGS. 5A and 5B, in the simulation example, the sizes of a lens cell in Y-axis direction and X-axis direction are respectively set to 2.80 mm and 3.64 mm. The curvature radius R of each lens cell is defined to satisfy R=15 mm. Further, the incident area of a fly-eye lens with respect to one laser light source is defined in such a manner that the incident area covers the area of lens cells in a matrix of 5×4 in the state of FIG. 5A. The incident area corresponds to a rectangular area of 12 mm in vertical direction and 12 mm in horizontal direction.

In the simulation example, the step number "s" of each lens cell group was incremented to 1, 2, ... from the state of FIG. 5A (where the step number "s"=0), and illuminance non-uniformity of laser light with respect to a liquid crystal panel was obtained by simulation with respect to each of the step numbers. In the simulation example, similarly to the arrangement shown in FIG. 2A, the displacement distance "d" between adjoining lens cell groups was defined in accordance with the equation (1).

Figure 6A:
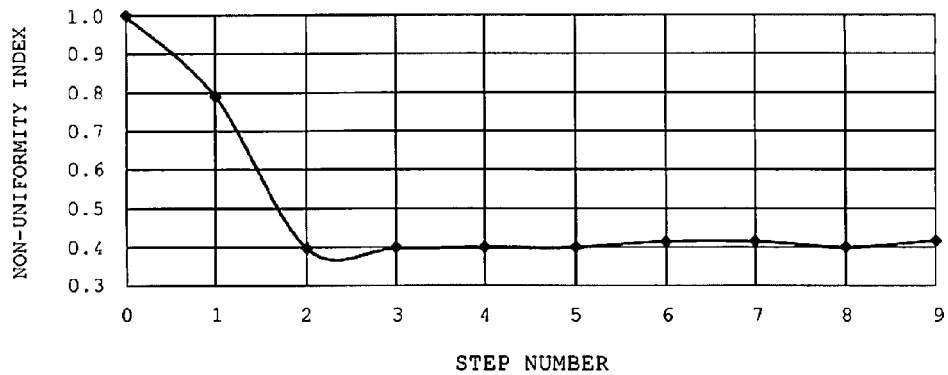
FIGS. 6A, 6B, and 6C are diagrams showing simulation results relating to simulation examples in the embodiment.
Figure 6B:
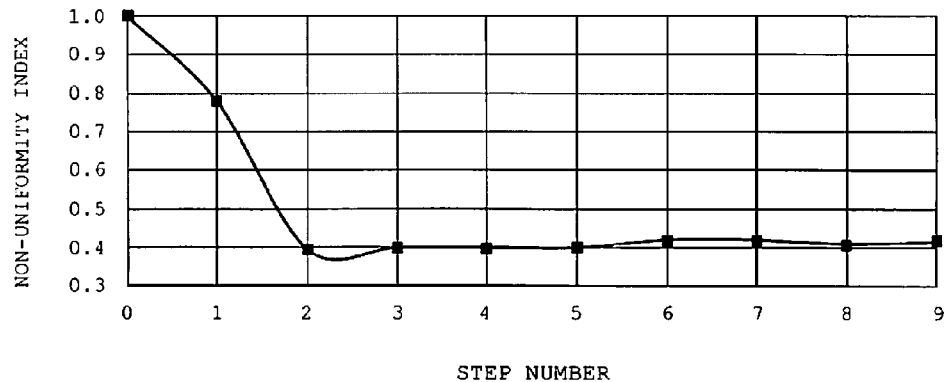
Figure 6C:
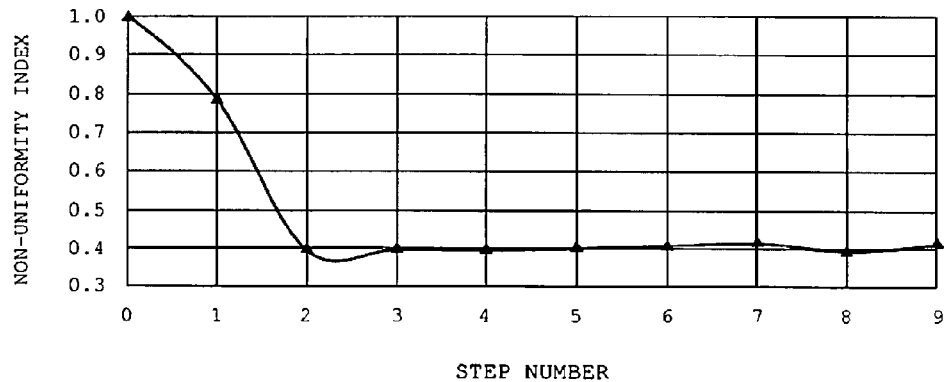

FIGS. 6A through 6C are diagrams showing simulation results. Specifically, FIGS. 6A through 6C show simulation results, wherein red, green, and blue wavelengths bands were used as wavelength bands of laser light to be emitted from the laser light source. The axis of ordinate in each simulation result shows a non-uniformity index, which is obtained by: calculating an average illuminance on the liquid crystal panel with respect to each line in X-axis direction; and normalizing a difference between maximum value and minimum value of the average illuminance by defining a difference at the step number "s"=0 as 1.

As is obvious from the simulation results, in the case where the step number "s" is: s=1, the illuminance non-uniformity (i.e. the non-uniformity index) is not satisfactorily suppressed. On the other hand, in the case where the step number "s" is: s=2, the illuminance non-uniformity is significantly suppressed. Thereafter, in the case where the step number "s" is further incremented, the illuminance non-uniformity is substantially plateau. The improvement effect on illuminance non-uniformity shows substantially the same tendency among the three wavelength bands. Accordingly, in the arrangement example shown in FIG. 1, defining the step number "s" of the first fly-eye lens and the second fly-eye lens constituting the fly-eye lens unit 13, 23, 33 to satisfy s≧2 is advantageous in satisfactorily suppressing the illuminance non-uniformity of R light, G light, B light with respect to the liquid crystal panel 16, 26, 36.

In the simulation example, the illuminance non-uniformity was measured by the non-uniformity index. In the case where the illuminance non-uniformity was measured by using an average deviation of illuminance (average deviation=standard deviation of illuminance on liquid crystal panel/average illuminance on the entire area of liquid crystal panel), substantially the same tendency as shown in FIGS. 6A through 6C was obtained.

Figure 7A:
FIGS. 7A and 7B are diagrams schematically showing simulation results relating to simulation examples in the embodiment.
Figure 7A:
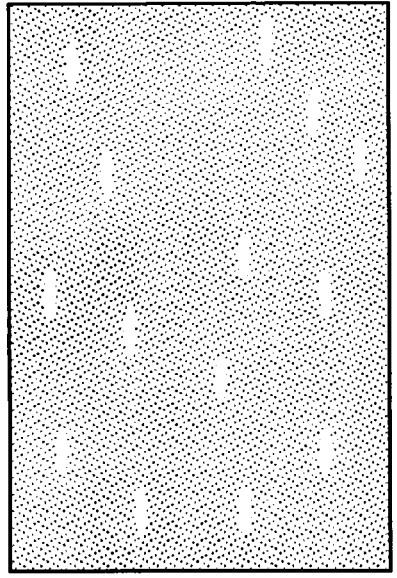
Figure 7C:
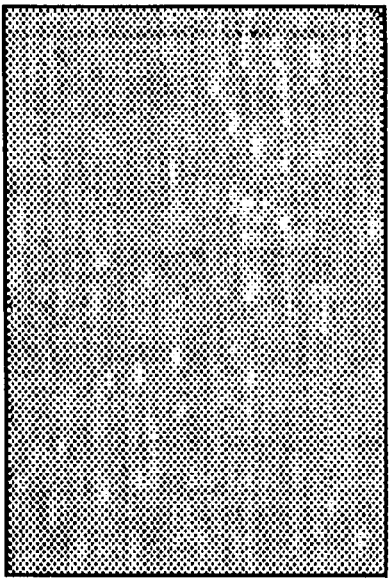
FIGS. 7C and 7D are diagrams showing simulation results relating to simulation examples in the embodiment.
Figure 7B:
Figure 7B:
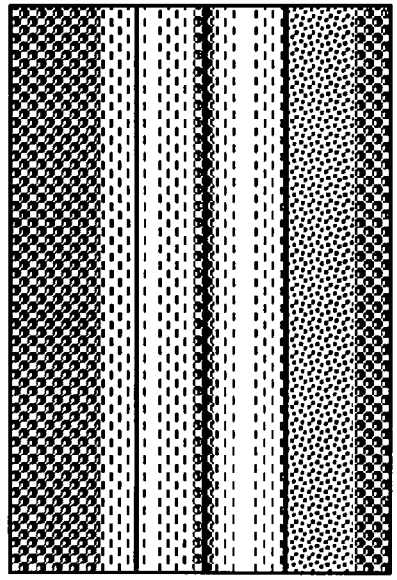
Figure 7D:
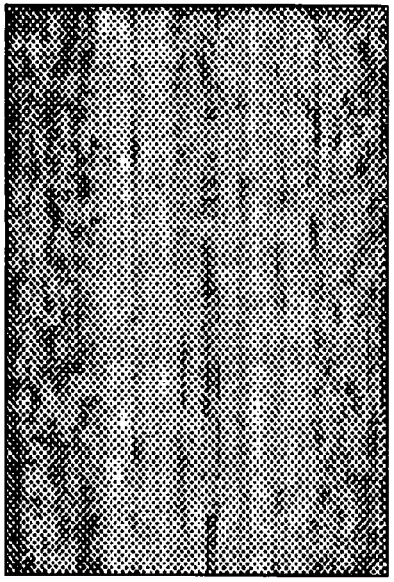

FIGS. 7C and 7D are diagrams showing illuminance non-uniformity on the liquid crystal panel in the simulation example in monochromatic expression using an optical simulation software, in the case where the step number "s" of the lens cell group in the fly-eye lens was set to s=0 and s=4, respectively. FIGS. 7A and 7B are diagrams showing FIGS. 7C and 7D schematically. As shown in FIGS. 7A and 7B, the light intensity is increased, as the color is closer to white.

As is obvious from comparison between FIGS. 7A and 7B, whereas a strip area having a high illuminance or a strip area having a low luminance has appeared in the diagram of s=0, the strip areas have substantially disappeared in the diagram of s=4. Also, in the diagram of s=4, the overall illuminance was made substantially uniform, although an area having a high illuminance has slightly discretely appeared. The above simulation results show that, as compared with the arrangement of the step number s=0, the arrangement of the step number s=4 is advantageous in significantly suppressing illuminance non-uniformity on the liquid crystal panel. Accordingly, setting the step number "s": s=4 enables to irradiate laser light onto the liquid crystal panel with a substantially uniform illuminance. As is obvious from the simulation results shown in FIGS. 6A through 6C, substantially the same effect as described above is obtained by defining the step number "s" to satisfy s≧2. Also, the illuminance non-uniformity can be suppressed with respect to any of R light, G light, and B light.

Figure 8:
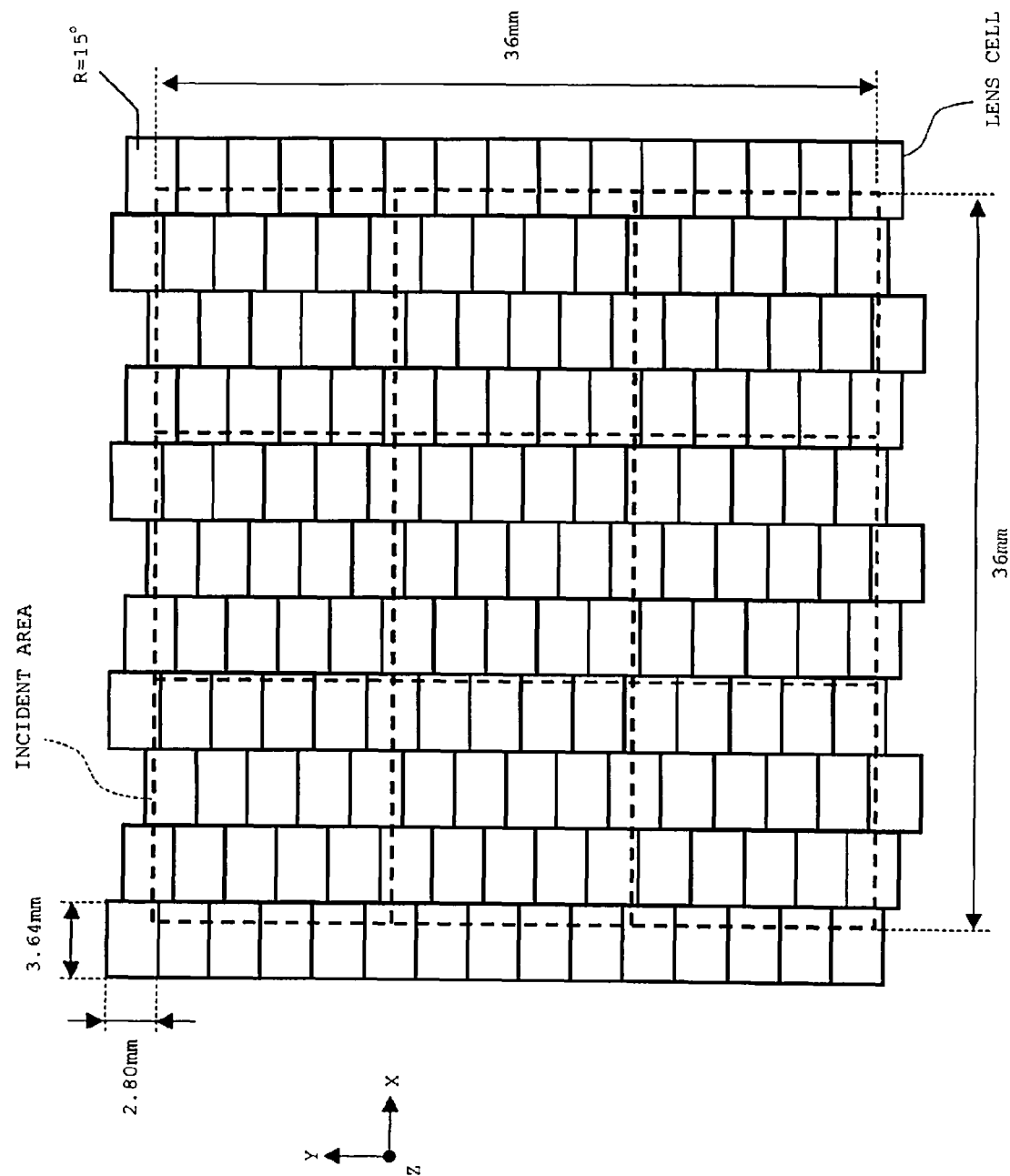
FIG. 8 is a diagram showing an arrangement of a fly-eye lens as another simulation example in the embodiment.

The above simulation example shows a case of using a single laser light source. The inventor has also confirmed that substantially the same effect is obtained by using plural laser light sources. For instance, FIG. 8 shows a simulation example, wherein nine laser light sources are arranged in matrix. The size and the curvature radius of a lens cell in the simulation example shown in FIG. 8 are the same as those in the above simulation example. Similarly to the above simulation example, laser light to be emitted from the respective laser light sources is converged in Y-axis direction by a corresponding individual cylindrical lens for conversion into parallel light. The laser light from the nine light sources as a whole is incident onto a fly-eye lens in an area of 36 mm in vertical direction and 36 mm in horizontal direction. In FIG. 8, the incident area of 36 mm in horizontal direction and 36 mm in vertical direction is divided into nine blocks. Each block corresponds to an area where the light from the corresponding laser light source is to be incident.

In the simulation example shown in FIG. 8, an illuminance condition of the liquid crystal panel was measured by turning on one of the nine laser light sources. As a result of the simulation experiment, simulation results showing substantially the same tendency as shown in FIGS. 6A through 6C were obtained with respect to each of the wavelength bands, in all the cases that any of the nine laser light sources was turned on. Accordingly, in the case where the nine laser light sources are simultaneously turned on, as schematically shown in FIG. 7B, laser light in each of the wavelength bands can be irradiated onto the liquid crystal panel with a substantially uniform illuminance. Accordingly, as shown in the optical system in FIG. 1, even if multiple laser light sources are arranged in matrix to constitute the laser arrays 11, 21, and 31, defining the step number "s" in the fly-eye lens to satisfy s≧2 enables to suppress illuminance non-uniformity of R light, G light, and B light with respect to the liquid crystal panels 16, 26, and 36.

As described above, the arrangement of the embodiment is advantageous in suppressing illuminance non-uniformity of R light, G light, and B light with respect to the liquid crystal panels 16, 26, and 36, and suppressing non-uniformity in a projected image resulting from the illuminance non-uniformity. The above arrangement is also advantageous in effectively suppressing illuminance non-uniformity by minor change on the arrangement of the fly-eye lens, without increasing the number of parts and the cost of the optical system, and without changing a control process.

The fly-eye lens in the embodiment is different from the conventional fly-eye lens merely in a point that the lens cell groups of the fly-eye lens in the embodiment are formed to have a step in Y-axis direction; and the fly-eye lens in the embodiment is substantially the same as the conventional fly-eye lens in function other than the above. Accordingly, the fly-eye lens in the embodiment can be incorporated in an optical system by simply replacing the conventional fly-eye lens with the fly-eye lens in the embodiment. In other words, a parameter such as the distance between two fly-eye lenses may be substantially the same as in the arrangement of using the conventional fly-eye lenses.

Figure 12B:
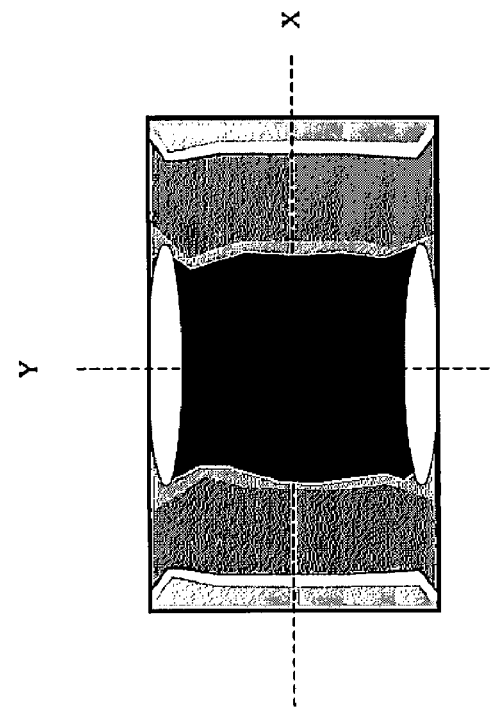
FIGS. 12A and 12B are diagrams for describing a light intensity distribution to be obtained in converting laser light into parallel light by a cylindrical lens.
Figure 12A:
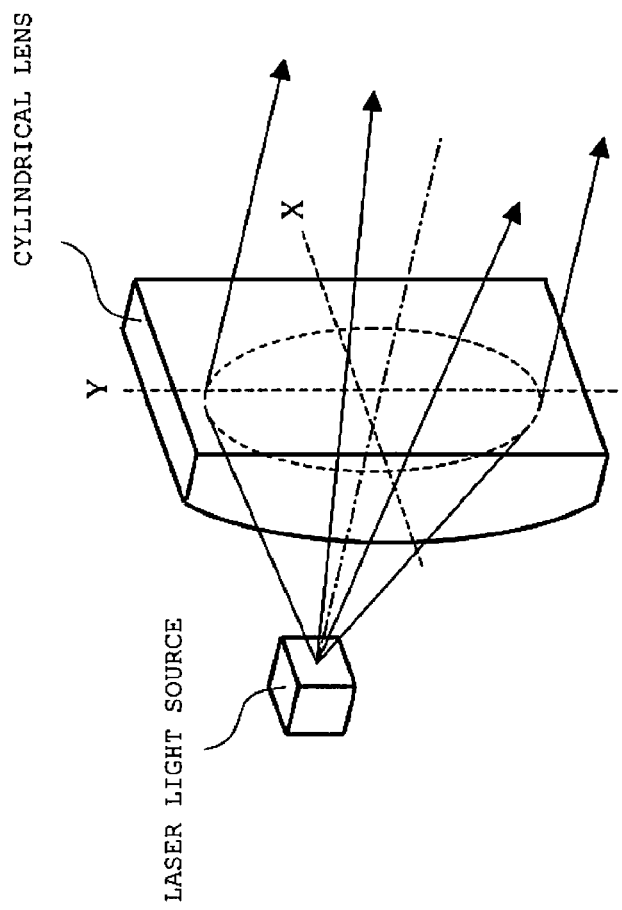

The light intensity distribution non-uniformity shown in FIG. 12B is increased, as the distance between a light source and a fly-eye lens is increased. In view of the above, the effect of the embodiment is more advantageously obtained, as the distance between a light source and a fly-eye lens is increased.

For instance, in the above simulation examples, the effect of suppressing illumination non-uniformity is more advantageously obtained in the case where the distance between a laser light and a fly-eye lens is 10 mm or more.

In the embodiment, as shown in FIG. 1, described is the arrangement that laser light is converged in Y-axis direction for conversion into parallel light. In the case where laser light is converged in X-axis direction for conversion into parallel light, as shown in FIG. 2B, illuminance non-uniformity on the liquid crystal panel can be suppressed by displacing the lens cell groups in X-axis direction. In the modification example as shown in FIG. 2B, illuminance non-uniformity can also be satisfactorily and effectively suppressed by defining the step number "s" to satisfy s≧2.

Also, properly combining two cylindrical lenses enables to converge laser light both in Y-axis direction and X-axis direction so that the laser light is converted into parallel light both in Y-axis direction and X-axis direction. In the modification, the light intensity distribution non-uniformity shown in FIG. 12B may be increased in a direction where the convergence is larger, in other words, in a direction of the major axis of beam spot having an effective diameter. In this arrangement, it is desirable to suppress intensity distribution non-uniformity in a direction where the convergence is larger. Accordingly, it is preferable to align the direction of forming a step in the fly-eye lens (i.e. the displacing direction of the lens cell group) with the major axis direction of beam spot having an effective diameter.

Alternatively, two cylindrical lenses and a collimator lens may be properly combined to convert laser light into parallel light both in Y-axis direction and X-axis direction.

In the embodiment, as shown in FIG. 1, an optical system from a light source to a liquid crystal panel is prepared individually with respect to R light, G light, and B light. Alternatively, as shown in FIG. 9, an optical system from a laser array 61 to a condenser lens 64 may be provided in common, and light may be separated into R light, G light, and B light by dichroic mirrors 65 and 67 to be provided posterior to the common optical system.

Figure 9:
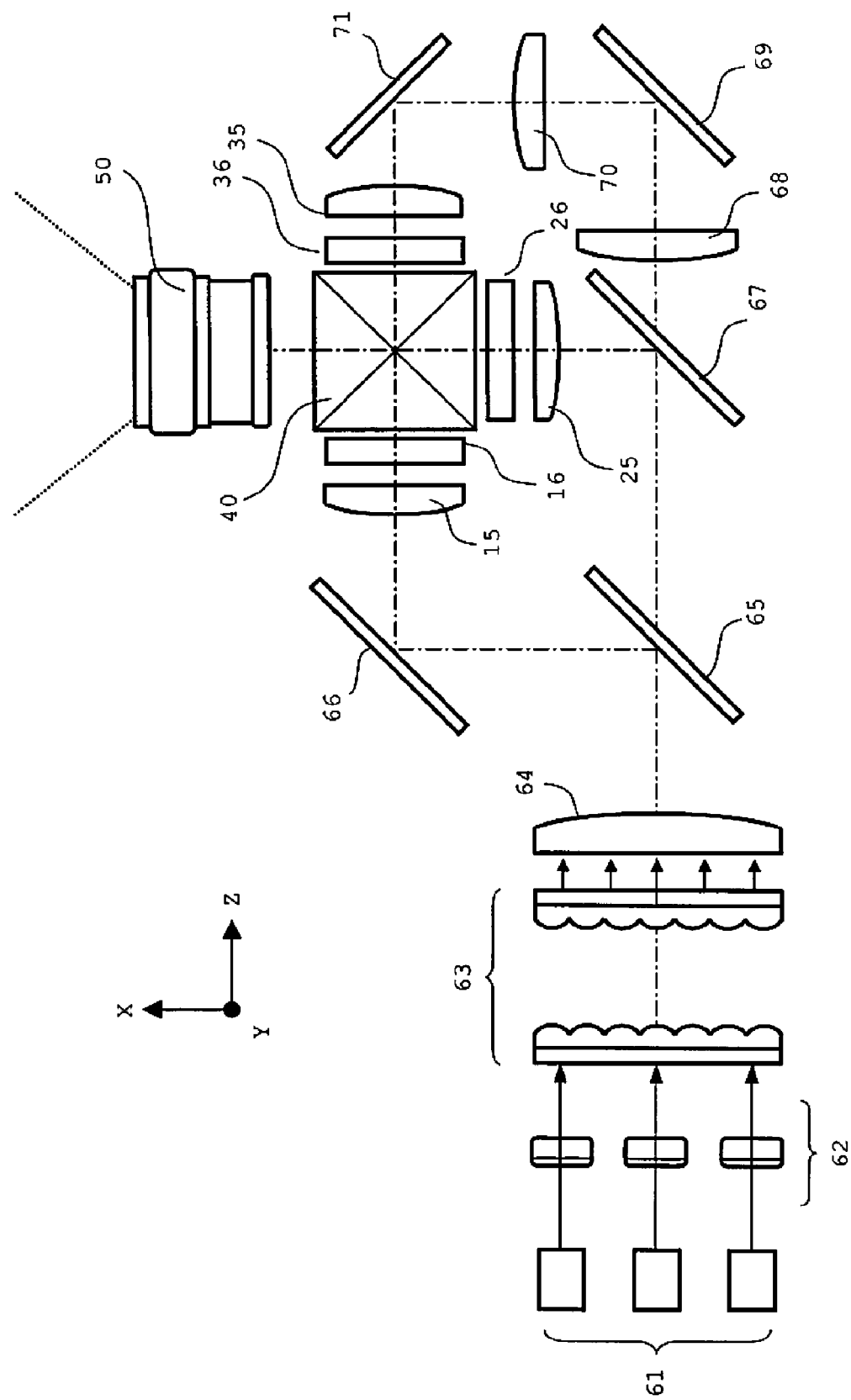
FIG. 9 is a diagram showing a modification example of the optical system for the projector in the embodiment.

In the arrangement example shown in FIG. 9, the laser array 61 is configured by arranging multiple laser sources for emitting R light, G light, and B light on Y-Z plane in matrix. R light, G light, and B light to be emitted from the laser array 61 are respectively converged in Y-axis direction by a corresponding cylindrical lens 62 for conversion into parallel light, followed by incidence onto a fly-eye lens unit 63. As shown in e.g. FIG. 2A, each fly-eye lens of the fly-eye lens unit 63 is constructed in such a manner that adjoining lens cell groups are displaced from each other in Y-axis direction. In the arrangement example, the step number "s" is defined to satisfy s≧2.

Laser light in each of the wavelength bands that has been transmitted through the fly-eye lens unit 63 is condensed by a condenser lens 64. Out of the laser light in the wavelength bands, R light is reflected and separated by the dichroic mirror 65. Thereafter, the R light is reflected on a mirror 66 for incidence onto a lens 15. The optical path of the R light thereafter is substantially the same as the corresponding optical path shown in FIG. 1.

Out of the G light and the B light that have been transmitted through the dichroic mirror 65, the G light is reflected on the dichroic mirror 67 for incidence onto a lens 25. The optical path of the G light thereafter is substantially the same as the corresponding optical path shown in FIG. 1.

The B light that has been transmitted through the dichroic mirror 67 propagates along an optical path constituted of relay lenses 68, 70, and mirrors 69 and 71 for incidence onto a lens 35. The optical path of the B light thereafter is substantially the same as the corresponding optical path shown in FIG. 1.

Figure 10:
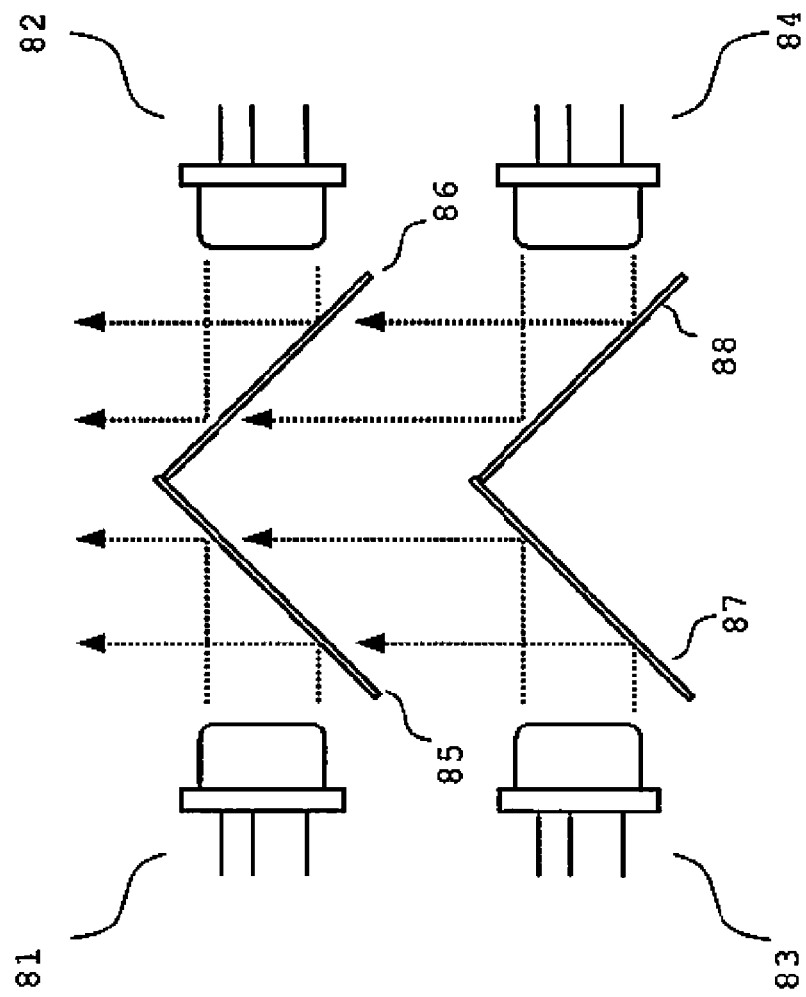
FIG. 10 is a diagram showing a modification example of a light source section in the embodiment.

In the embodiment, a light source section is constructed by arranging laser light sources in matrix. Alternatively, for instance, as shown in FIG. 10, a light source section may be constructed by combining multiple laser light sources and multiple mirrors. In the arrangement example shown in FIG. 10, the light source section is constituted of four semiconductor lasers 81, 82, 83, and 84, and four mirrors 85, 86, 87, and 88. In the arrangement example shown in FIG. 10, the semiconductor lasers 81 and 82 have optical axes thereof aligned to each other, and the semiconductor lasers 83 and 84 have optical axes thereof aligned to each other.

Laser light to be emitted from the semiconductor lasers 81 and 82 are respectively reflected on the mirrors 85 and 86 in Z-axis direction. Laser light to be emitted from the semiconductor lasers 83 and 84 are respectively reflected on the mirrors 87 and 88 in Z-axis direction. The unit constituted of the semiconductor lasers 81 and 82, and the mirrors 85 and 86 is shifted in position in Y-axis direction with respect to the unit constituted of the semiconductor lasers 83 and 84, and the mirrors 87 and 88.

FIG. 10 shows the arrangement example, in which illumination light is formed by combining light from the four semiconductor lasers on the mirrors. The number of semiconductor lasers and the number of mirrors are not limited to the above. For instance, as shown in FIG. 8, in the case where nine laser beams are guided to the fly-eye lens, nine semiconductor lasers may be prepared, and laser beams to be emitted from the respective semiconductor lasers may be combined on mirrors. In the case where laser beams are combined on mirrors, however, it is necessary to arrange the semiconductor lasers and the mirrors at such positions that the laser beams from the respective semiconductor lasers come close to the center of the optical axis of illumination light so that an Etendue value is minimized.

Further alternatively, it is possible to modify the optical system into an LCOS optical system. In the LCOS optical system, a reflective liquid crystal panel is used as an imager. Specifically, a video image is rendered on a liquid crystal panel by forming a reflective layer for polarizing light on an outer layer of a liquid crystal panel, and electrically controlling a status of the reflective layer. The LCoS optical system is also advantageous in suppressing illumination non-uniformity with respect to a liquid crystal panel by using the fly-eye lens having the above arrangement. With use of the LCoS optical system, non-uniformity in a projected image resulting from illuminance non-uniformity can be suppressed.

In the embodiment, it is proper to define the step number "s" of the lens cell group to satisfy s≧2 in the aspect of suppressing illuminance non-uniformity. It is also conceived to be desirable to set the step number "s" to 2 or more rather than 1 in the aspect of lens workability. Specifically, in the case where the step number "s" is set to 1, shear droop may occur in a boundary portion between lens cells in press working due to a large interval (i.e. displacement distance "d") between lens cells. This may cause relatively large light amount loss resulting from shear droop. On the other hand, in the case where the step number "s" is set to 2 or more, the interval (i.e. the displacement distance "d") between lens cells is reduced. As a result, the amount of shear droop can be suppressed, thereby suppressing light amount loss resulting from shear droop.

The lens cell groups are not necessarily regularly displaced. Specifically, in FIG. 2A, the lens cell groups are displaced downwardly by the displacement distance "d", as the lens cell groups are shifted from the leftmost lens cell group in rightward direction; and then displaced again in the similar manner as in the foregoing displacement downwardly by the displacement distance "d", as the lens cell groups are shifted from the fourth-column lens cell group from the left side in rightward direction. Alternatively, as shown in FIG. 11A, for instance, the lens cell groups may be displaced downwardly in the similar manner as shown in FIG. 2A, as the lens cell groups are shifted to the fourth-column lens cell group from the left side; the fifth-column lens cell group from the left side is shifted downwardly by a distance twice as large as the displacement distance "d" with respect to the fourth-column lens cell group from the left side; and the sixth-column lens cell group from the left side is displaced downwardly by the displacement distance "d" with respect to the fourth-column lens cell group from the left side.

Figure 11B:
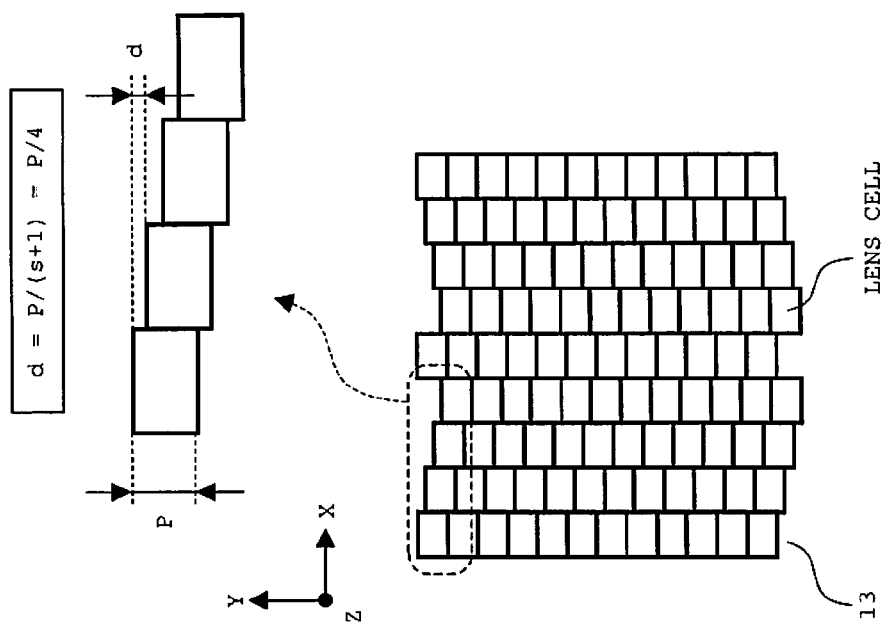
FIGS. 11A and 11B are diagrams showing other arrangement examples of the fly-eye lens in the embodiment.

Further alternatively, as shown in FIG. 11B, the cell groups shown in FIG. 3B may be brought to a randomly displaced state. In the arrangement example shown in FIG. 11B, the displacement state from the leftmost lens cell group to the fifth-column lens cell group from the left side is the same as shown in FIG. 3B; the sixth-column lens cell group from the left side is displaced downwardly by a distance three times as large as the displacement distance "d" with respect to the fifth-column lens cell group from the left side; the seventh-column lens cell group from the left side is displaced downwardly by a distance twice as large as the displacement distance "d" with respect to the fifth-column lens cell group from the left side; and the eighth-column lens cell group from the left side is displaced downwardly by the displacement distance "d" with respect to the fifth-column lens cell group from the left side.

Figure 11A:
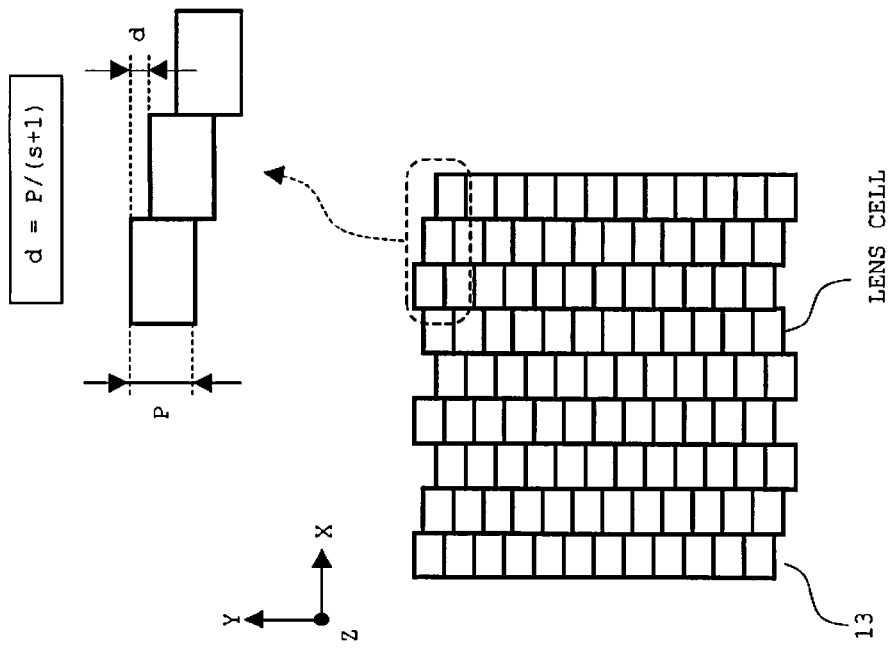

As described above, as shown in FIG. 2A or 3B, the lens cell groups may be regularly displaced, or as shown in FIGS. 11A and 11B, the lens cell groups may be randomly displaced. Substantially the same effect as in the simulation examples in the embodiment may be obtained in the arrangement of randomly displacing the lens cell groups.

The embodiment of the present invention has been described as above, but the present invention is not limited to the foregoing embodiment. Also, the embodiment of the present invention may be changed or modified in various ways other than the above. The embodiment of the present invention may be changed or modified according to needs, as far as such changes and modifications do not depart from the scope of the present invention hereinafter defined.

What is claimed is:

1. An illumination device, comprising:
    a light source;
    an optical element for converting light from the light source into parallel light in at least one direction; and
    a fly-eye lens for allowing incidence of the parallel light from the optical element to guide uniform light to an area for illumination, wherein
    assuming that a certain number of lens cells in the fly-eye lens in a column direction or a row direction are defined as a lens cell unit, one of the lens cell units is relatively displaced with respect to the other one of the lens cell units in the column direction or the row direction, and the number of steps for displacement among the lens cell units in the fly-eye lens is set to 2 or more,
    assuming that the number of steps for displacement is "s", and a size of one lens cell in the displacing direction of the lens cell unit is "P", a displacement distance "d" of the lens cell unit per step is defined in accordance with the following equation:
    $d=P/(s+1)$.

2. The illumination device according to claim 1, wherein
the light source includes a laser light source,
the optical element is operable to converge laser light from the laser light source at least in a direction of major axis of beam spot for conversion into the parallel light, and
the lens cell units in the fly-eye lens are displaced from each other in the major axis direction.

3. The illumination device according to claim 1, wherein the optical element includes at least one cylindrical lens.

4. A projection video display device, comprising:
an illumination device for irradiating light onto an area for illumination; and
an imager to be disposed in the area for illumination,
the illumination device including:
    a light source;
    an optical element for converting light from the light source into parallel light in at least one direction; and
    a fly-eye lens for allowing incidence of the parallel light from the optical element to guide uniform light to the area for illumination, wherein
    assuming that a certain number of lens cells in the fly-eye lens in a column direction or a row direction are defined as a lens cell unit, one of the lens cell units is relatively displaced with respect to the other one of the lens cell units in the column direction or the row direction, and the number of steps for displacement among the lens cell units in the fly-eye lens is set to 2 or more,
    assuming that the number of steps for displacement is "s", and a size of one lens cell in the displacing direction of the lens cell unit is "P", a displacement distance "d" of the lens cell unit per step is defined in accordance with the following equation:
    $d=P/(s+1)$.

5. A fly-eye lens, wherein
assuming that a certain number of lens cells in the fly-eye lens in a column direction or a row direction are defined as a lens cell unit, one of the lens cell units is relatively displaced with respect to the other one of the lens cell units in the column direction or the row direction, and the number of steps for displacement among the lens cell units in the fly-eye lens is set to 2 or more,
assuming that the number of steps for displacement is "s", and a size of one lens cell in the displacing direction of the lens cell unit is "P", a displacement distance "d" of the lens cell unit per step is defined in accordance with the following equation:
$d=P/(s+1)$.

* * * * *